US006877021B2

(12) United States Patent
Schneider et al.

(10) Patent No.: US 6,877,021 B2
(45) Date of Patent: *Apr. 5, 2005

(54) CALCULATION METHOD AND APPARATUS

(75) Inventors: Mark Damon Schneider, Dove Heights (AU); Henricus Raath, Ryde (AU); Colin Arthur Lipworth, Woollahra (AU)

(73) Assignee: Classic Solutions PTY Limited, Sydney (AU)

( * ) Notice: Subject to any disclaimer, the term of this patent is extended or adjusted under 35 U.S.C. 154(b) by 515 days.

This patent is subject to a terminal disclaimer.

(21) Appl. No.: 09/819,778

(22) Filed: Mar. 28, 2001

(65) Prior Publication Data

US 2002/0174151 A1 Nov. 21, 2002

(51) Int. Cl.[7] ................................................ G06F 7/38
(52) U.S. Cl. ...................... 708/490; 708/300; 708/319
(58) Field of Search ................................. 708/300, 301, 708/303, 319, 320, 490

(56) References Cited

U.S. PATENT DOCUMENTS

| 5,548,543 A | * | 8/1996 | Wang | 708/319 |
| 5,904,731 A | * | 5/1999 | Matsui | 708/603 |
| 6,018,755 A | * | 1/2000 | Gonikberg et al. | 708/319 |

* cited by examiner

Primary Examiner—Chuong Dinh Ngo
(74) Attorney, Agent, or Firm—Kenyon & Kenyon

(57) ABSTRACT

A method of reducing the amount of computer memory utilized in calculating a formula on a collection of a plurality of series of data values, the method including the steps of: (a) for each data value member of at least one series of the collection, determining the size of a window of data values required to calculate the formula; (b) obtaining the size of the window required for the at least one series on the basis of the determination, and (c) utilizing the window having the predetermined size to determine data values to be stored in computer memory when calculating the formula when applied to other series of data values in the collection.

9 Claims, 5 Drawing Sheets

CALCULATION METHOD AND APPARATUS

FIELD OF THE INVENTION

The present invention relates to a method of optimising the memory used by computer software. In particular it provides technique for minimising the memory used by modelling/simulation packages including spreadsheets or the like.

BACKGROUND OF THE INVENTION

Computer software that is used for financial forecasting and scientific modelling is well known. Typically software of this type includes calculating a series of formulas on a large series of data sets. Often, extremely sophisticated models and formulas are used and the calculation of the resultant formulas by such modelling software will typically constitutes the bulk of the memory requirements used by the software or computer model.

For example, consider a model calculating one hundred quantities (columns) over six hundred iterations of the model, with the result for each iteration being stored in a cell of the column If each cell requires ten bytes to stores its entry then the memory requirements of the modelling software will be around 600 Kb.

Although, these days memory is inexpensive, the optimisation of memory usage when running such models or using large data sets is still a priority. This is especially the case when model complexity or storage requirements increase dramatically with problem size.

Clearly there is a need for an alternative method of memory optimisation for use by modelling packages. Especially since memory access times can be orders of magnitude slower if the data values are not available in primary memory.

SUMMARY OF THE INVENTION

In accordance with a first aspect of the present invention, there is provided a method of calculating a formula on a collection of series of data values, the method comprising the steps of: (a) for each data value member of a first one of the collection, determining a window around a current data value member of data values required to calculate the formula; (b) utlising the window to determine the memory location of the stored location of corresponding data values in the calculation of the forumula when applied to other series of data values in the collection.

The step (b) can comprise, for members within a series of data values, (a) for a first one of the members, utilising the window to determine the memory location of the stored location of an initial set of data values in the series; and (b) for subsequent current members, revising the memory location of only of new member of the window.

In accordance with a further aspect of the present invention, there is provided a method of calculating a formula on a collection of series of data values, the method comprising the steps of: (a) for each data value member of a first one of the collection, determining a window around a current data value member of data values required to calculate the formula; (b) utilising the window to determine the memory location of the stored location of corresponding data values in the calculation of the formula when applied to other series of data values in the collection.

The step (b) can comprise, for members within a series of data values, (a) for a first one of the members, utilising the window to determine the memory location of the stored location of an initial set of data values in the series; and (b) for subsequent current members, revising the memory location of only of new member of the window.

In accordance with a further aspect of the present invention, there is provided in a computer system with a primary memory store, a method of carrying out a formula calculation on a series of data values, the calculation being carried out using members of the series with the calculation for a current member of the series being dependant on other data values located relative to the current member of the series, the method comprising the steps of: (a) for a given current member of the series, determining from the formula a relative series of consecutive data values required for determining the formula for the current member; (b) for each current member of the series of consecutive data values: (i) ensuring a corresponding relative series of consecutive data values to the current member are currently loaded into the first primary memory store; (ii) performing the formula calculation to determine a current output value.

Preferably, the step (b) can comprise for a first one of the current members, loading into the first primary memory store and initial corresponding relative series of consecutive data values; and for subsequent current members, loading only new members of the corresponding relative series into the primary memory store.

The series of consecutive data values are preferably arranged in a column and the method can be extended to be applied to multiple groups of consecutive data values using a different formula for each group.

New values are preferably loaded into the primary store at an address determined by a modified modulo arithmetic operator which produces positive address values only.

BRIEF DESCRIPTION OF THE DRAWINGS

Notwithstanding any other forms which may fall within the scope of the present invention, preferred forms of the invention will now be described by way of example only, with reference to the accompanying drawings in which.

DETAILED DESCRIPTION OF THE EMBODIMENTS

In the preferred embodiment. There is provided a method for minimising the memory required to calculate complex formulas on large data sets. The method proceeds by first determining a 'window' of data values within the data set required for storage in primary memory to calculate a current output value and then sliding the window along the data set to determine subsequent data values for storage within primary memory. The window can be used to remap logical data values to phyiscal data values so as to substantially reduced the memory requirements of calculating the formula.

Figure 1:
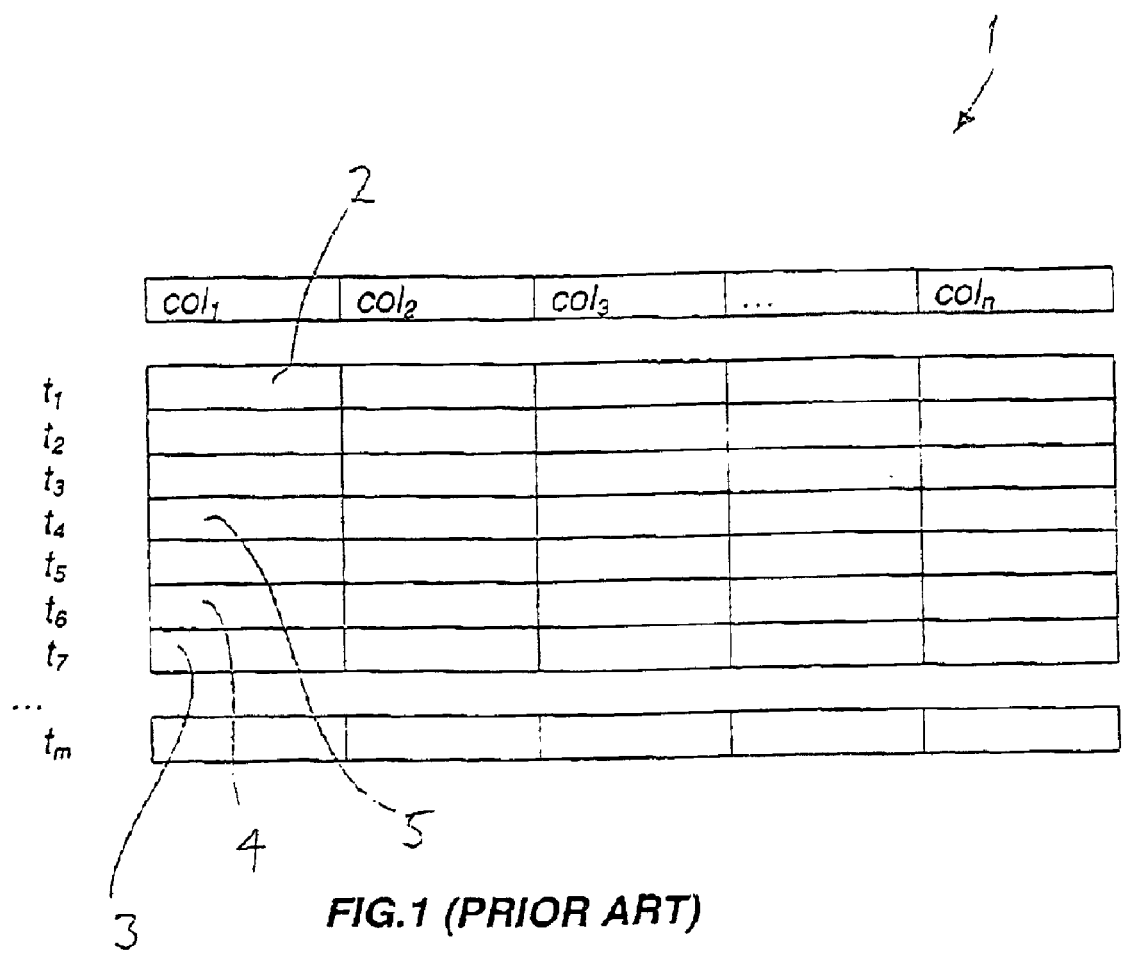
FIG. 1 shows a general format of an array of data values to which the method of the present invention is applicable.

Turning to FIG. 1, there is shown an initial example of a series of data values arranged in a series of columns. As will be clear to a person skilled in the art the computer programming, the data array 1 consists of n columns $col_1 \ldots col_n$ aligned vertically with each column for example $col_1$ consists of m cells. The cells in each column $col_1 \ldots col_n$ are aligned in horizontal rows denoted by index $t_1 \ldots t_m$. Typically each column $col_1, \ldots col_n$ will store the outcome of a calculation for one particular value over m time periods, whereas each row, say $t_k$, will represent the results of each of the n calculated values at one particular instant, say at the $k^{th}$ time period.

The data contained in any particular cell in the array 1 may be calculated using data contained in a number of other cells of the same column. For example, cell 3 may be calculated by adding the value of cell 4 and the value contained in cell 5. Therefore, in order for the value of cell 3 to be calculated the values in cell 4 and 5 must be calculated first. Therefore, during the operation of the software the value of every cell may depend on a number of other cells.

In some cases cells belonging to a column will be calculated using all previously calculated cells in that column. Whereas the cells of other columns may be calculated from only a few previously calculated cells. The method of the preferred embodiment is based on the realisation that in columns of the second type the number of cells stored in memory may be reduced while still allowing the values of all cells in the original column to be calculated.

To calculate the sliding sizes each model is initially created at a full size. A test projection is done to keep track of a number of attributes for each column and each cell. For each column a determination is made of the smallest required sliding window size so far, the location of the potential sliding window and the direction in which the window is sliding during the projection. For each cell status data is kept as to whether the cell has been calculated, is busy being calculated and if it falls within its current potential sliding window.

Typically, a model or simulation of the type described above may be run repeatedly for a number of different scenarios having varying initial conditions. However, in all cases the underlying calculation process will remain the same. Therefore, a set of optimisation characteristics can be determined for each model regardless of the initial data used. In order to calculate the amount of memory optimisation which is possible for a particular column the model or simulation is created at full size on a particular column in the first instance.

Figure 2:
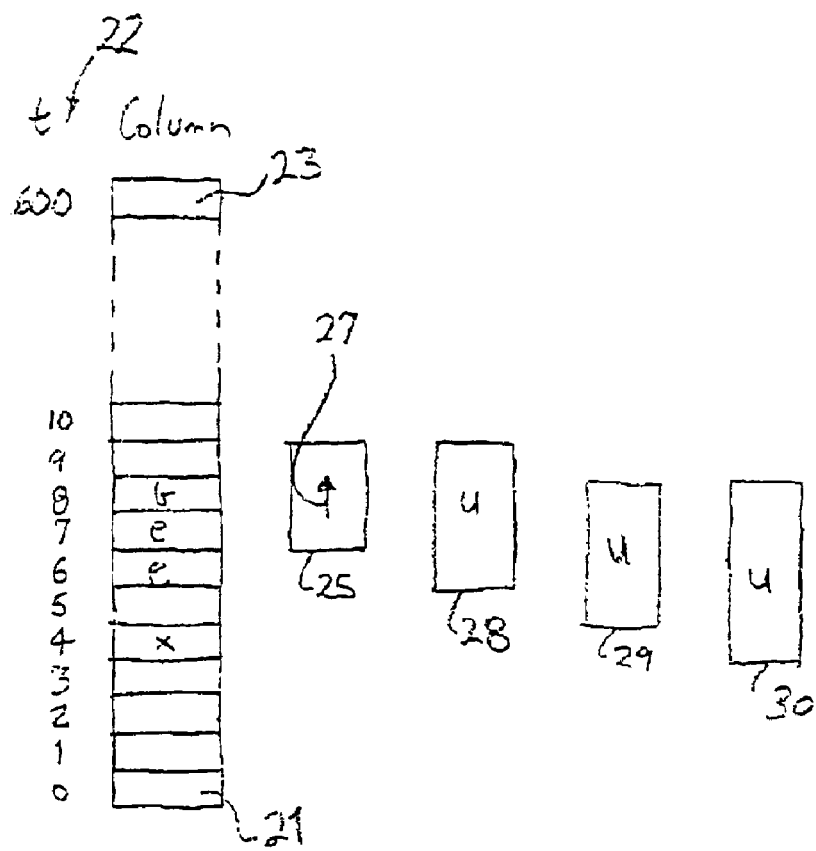
FIG. 2 shows a process of determining sliding window sizes in a first example usage of the present invention.

An example of the process for calculating the smallest number of cells which may be used to represent a column will now be described initially with reference to FIGS. 2. By way of example, FIG. 2 shows a column of data 20 representing time periods from time t=0 (cell 21) to time period t=600 (cell 23). It is assumed that, in respect of each cell value in the column 20, a value e denotes the cell value exists already, a value b represents a cell value that is busy being calculated (perhaps as part of the current formula), and the value x is a new value being sought.

Initially, a sliding window 25 of current data values comprises three cells (cells corresponding to month 7 to 9) is assumed to exist. If a value x being asked for exists and the month is in the sliding window, no work is required. If not, consider first the case where it is necessary to slide down, i.e., towards a lower time value (sliding up is exactly the same algorithm, except in the other direction). If month is below the current potential sliding window, it is necessary to either slide down the window 25 or make the sliding window bigger or both. If the current sliding direction is locked into sliding up, it is necessary to make the sliding window bigger by growing the window downwards, i.e., by adjusting the bottom of the current window and making its size bigger.

The sliding window 25 represents a first estimated size for the optimised column. In order to determine whether the current size of the sliding window 25 is optimum, it may be slid along on the underlying column or expanded, until the sliding window encompasses all values of interest. The next phase is directed to placing a "sliding window" large enough to include all values currently being calculated, and all of the values in other cells required to calculate such values. Initially, the size and positioning of these cells are not known so a "sliding window" 25 of a small size, in this case three cells, is aligned such that one cell in the window is placed over the value being calculated (cell 8).

Now, let us apply the condition that the sliding window 25 must slide initially in the upward direction as shown by arrow 27. The following pseudo code can then employed to obtain the optimum sliding window size for this column of data:

Initial Calculation of Window Size

The sliding window has a start and stop position and a sliding direction initially undefined.

Considering first the case where the period or data values required is below the current window. (The rules for the period above the current window are the same, just in the other direction.)

if period <bottom_of_sliding_window, then it is necessary to either 'slide' down or make the sliding window bigger.

if the present direction is 'locked into' sliding up then it is necessary to make the sliding window bigger. I.e., the window should grow downwards.

if the sliding window becomes big enough to accommodate all calculated values then it is no longer bound by a sliding direction (all values are within the current window range).

if the present direction is 'locked into' sliding up, then either when we entered the function or if direction changed from 'up' to 'undecided' (see previous point) then it is possible to slide down by dropping values off the top.

No value that is busy being calculated may be dropped off. In this case the sliding window size needs to be grown.

If values dropping off have been calculated, then the direction should be locked into sliding 'down'.

To illustrate this process reference is made to FIG. 2. Sliding window 25 is three cells long beginning at cell 7 and sliding in the upward direction 27. Applying the above algorithm it is possible to either slide in the upward direction or grow the sliding window 25. Of these two options growing the window in a downwards directions, i.e. adding a cell to the sliding window 25 corresponding to cell 6 is the most desirable. The result of performing this action is expansion of the sliding window 28. The sliding window 28 is now 4 cells long beginning at cell 6. Since all the calculated values are within the sliding window, the sliding widow direction becomes undefined.

Now it is possible to slide the window down 29 as the direction has become undefined with the window being slid toward the target cell 4. As the value in cell 8 is busy being calculated, it is necessary to grow the size of the window 30.

Once the correct sliding window size has been determined using the steps described above the sliding window can be used during actual projection made by the software or model. Hence, when we run with an actual sliding window on another data set through the same sequence of cells, a sliding window of size 5 will be big enough to handle the values necessary in calculating the value sought. Any smaller window will be too small.

The pseudo code representing the use of the use of the calculated window size on other data sets can be as follows:

First, consider the case where the period required is below the window. (The rules for the period above the window are the same, just in the other direction.)

Move the window down, dropping values from the top, until the period required is in the window.

If the cell dropping off has been calculated then it is necessary to slide down.

If the cell being dropped off is still busy being calculated, an error occurs. The sliding window is not big enough.

Figures 3, 4:
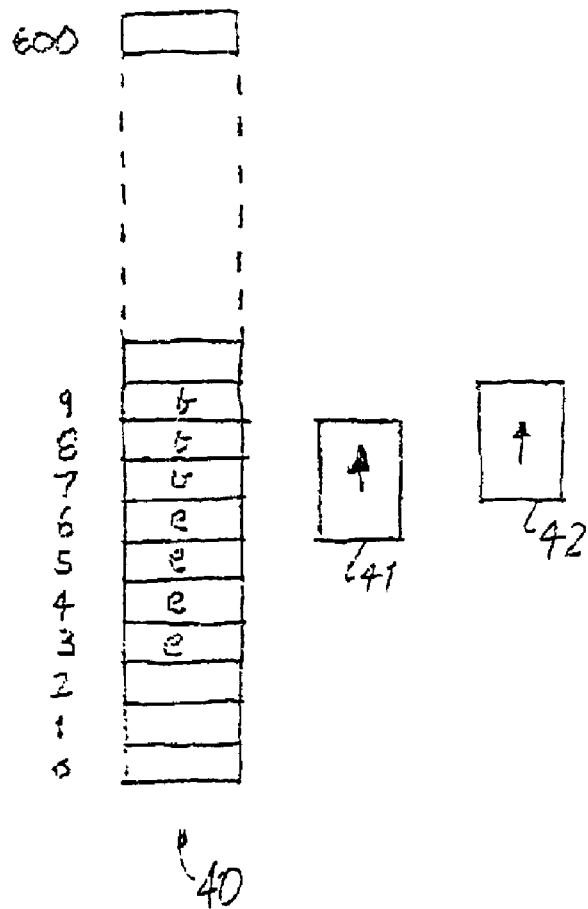
FIG. 3 shows a process of using a sliding window.
FIG. 4 illustrates the process of mapping logical to physical address in accordance with an embodiment of the present invention.

An exemplary use of a sliding window on a column of data is shown in FIG. 3. A column of data 40 has cells numbered 0 to 600. Cells in which a value exists are marked with the letter e, and cells, for which a value is currently busy being calculated are marked with the letter b. The sliding window 41, of length 3 cells and beginning at cell 6 is used for this column of data. The size of the sliding window 41 has assumed to have been calculated using the method described above and therefore, should be of the optimal size for the column. If the size of the sliding window 41 has been calculated correctly for this example, cells 3–5, for which values have already been calculated, should not need to be referred to again in order to calculate the values contained in subsequent cells in the column, and therefore the sliding window 41 need not contain these values. The cells of the sliding window 41 occupy consecutive positions in the window from bottom to top. As the window slides 42, the data contained in cell 9 is read into the sliding window.

Whilst logically, the window can move as shown in FIG. 3, ideally in practice the data is stored so that it only needs to be read once into physical memory with addresses being remapped using modulo arithmetic. Hence, when the window slides from position 41 to 42 in FIG. 3, the value at index position 0 (previously month 6) drops off to make space for the value at month 9. FIG. 4 provides an illustration of the mapping of logical to physical address. In order to determine which position in the sliding window a particular cell of the underlying column will fall, a simple formula can be used. The formula is:

$$i = \text{cell no. mod (window size)}$$

where i is the cell position in the sliding window of the value of interest; the cell no. is the cell number of the value of interest in the underlying column; and window size is the size of the sliding window.

During implementation of a program using sliding windows as described above, there will be a need to calculate which particular cell of the sliding windows a variable falls in. However, a standard mod operator e.g. % in C++ may not be suitable, as the cell numbers used for the underlying column may be negative. Using a negative cell number would cause the mod operator to give incorrect results. The modulo operate function can be calculated as follows:

| operator % | Modified mod() function |
|---|---|
| 4 % 3 = 1 | mod(4, 3) = 1 |
| 3 % 3 = 0 | mod(3, 3) = 0 |
| 2 % 3 = 2 | mod(2, 3) = 2 |
| 1 % 3 = 1 | mod(1, 3) = 1 |
| 0 % 3 = 0 | mod(0, 3) = 0 |
| −1 % 3 = −1 | mod(−1, 3) = 2 |
| −2 % 3 = −2 | mod(−2, 3) = 1 |

The table above contains the results of the % operator of C++ for column numbers ranging between −2 and 4 for a window size of 3, compared to the outcome of a specialised mod function adapted to produce the results required by the sliding windows method described. It can be seen that the values for cell numbers 0–4 are the same for both the C++ % operator and the adapted mod operator. However, when the cell number becomes negative the C++ % operator also produces negative results, which are unacceptable in the present application. The adapted mod function continues in a cyclical fashion producing positive results regardless of the negative cell position number. Therefore using the adapted mod function as described it is possible to determine which cell in the sliding window will contain the value representative of a particular cell of the underlying column.

Figure 5:
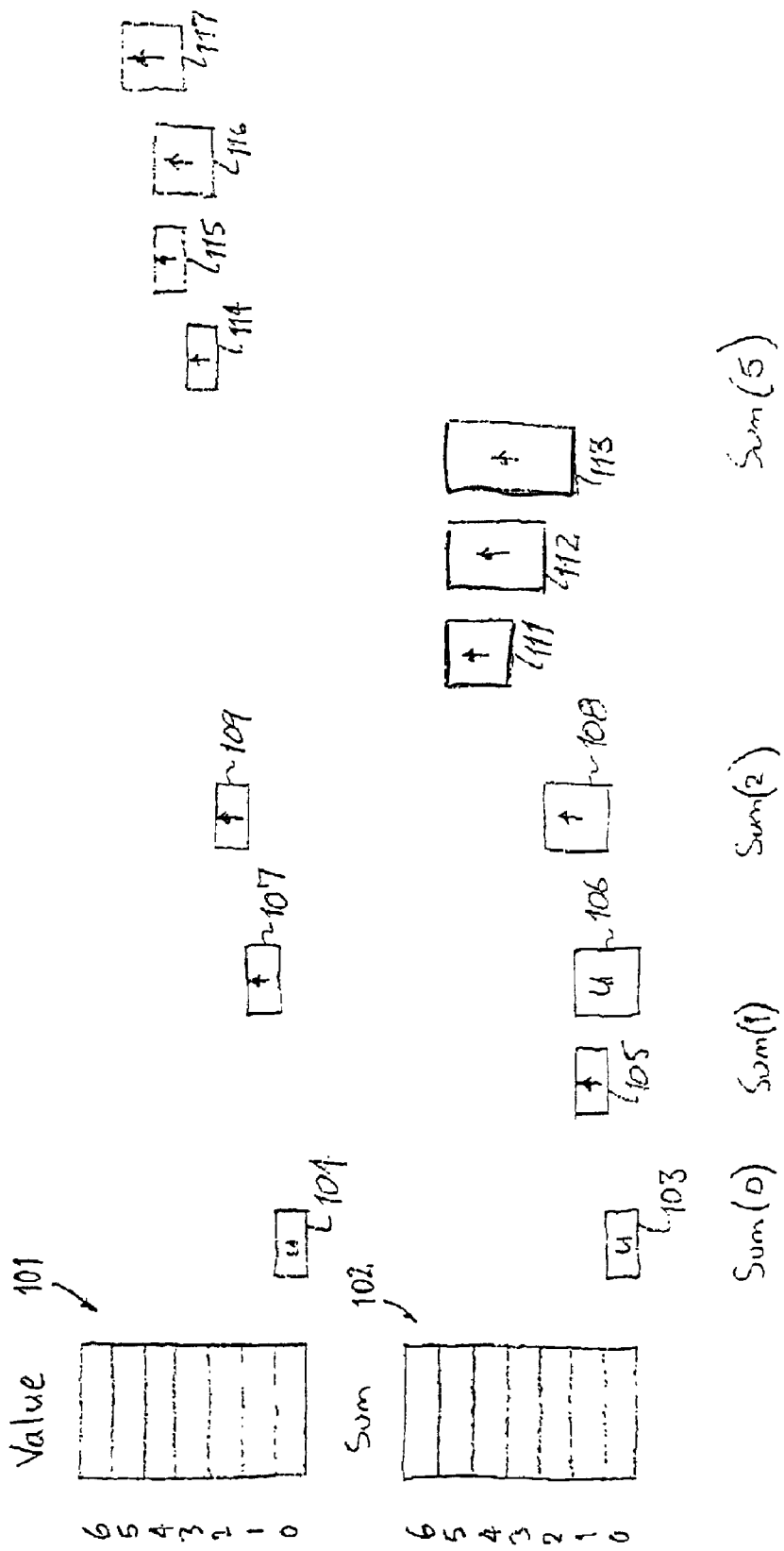
FIG. 5 illustrates the process of determining window sizes in a second example usage of the present invention.

A second more complex example use of the above window calculation technique will now be described initially with reference to FIG. 5. In this example, it is assumed that two arrays including a value array 101 and a sum array 102 are to be determined with the determination to be repeated for a large number of sets of data values.

The formula utilised for calculating the value array can be as follows:

val(int t) {
if (t==4)
//only if t==4 does this formula depend on val(3)
return val(3);
else
//normally, doesn't depend on other formulae
return t;
}

The formula for calculating the sum array can be as follows:

sum(int t) {
if (t==0)
//to start off with, just return val(0)
return val(0);
else
//all other cases, add new val(t) to cumulative total
return sum(t−1)+val(t);
}

It is further assumed that the user is seeking the following values for each data set: sum(0), sum(1), sum(2) and sum(5).

Figure 6:
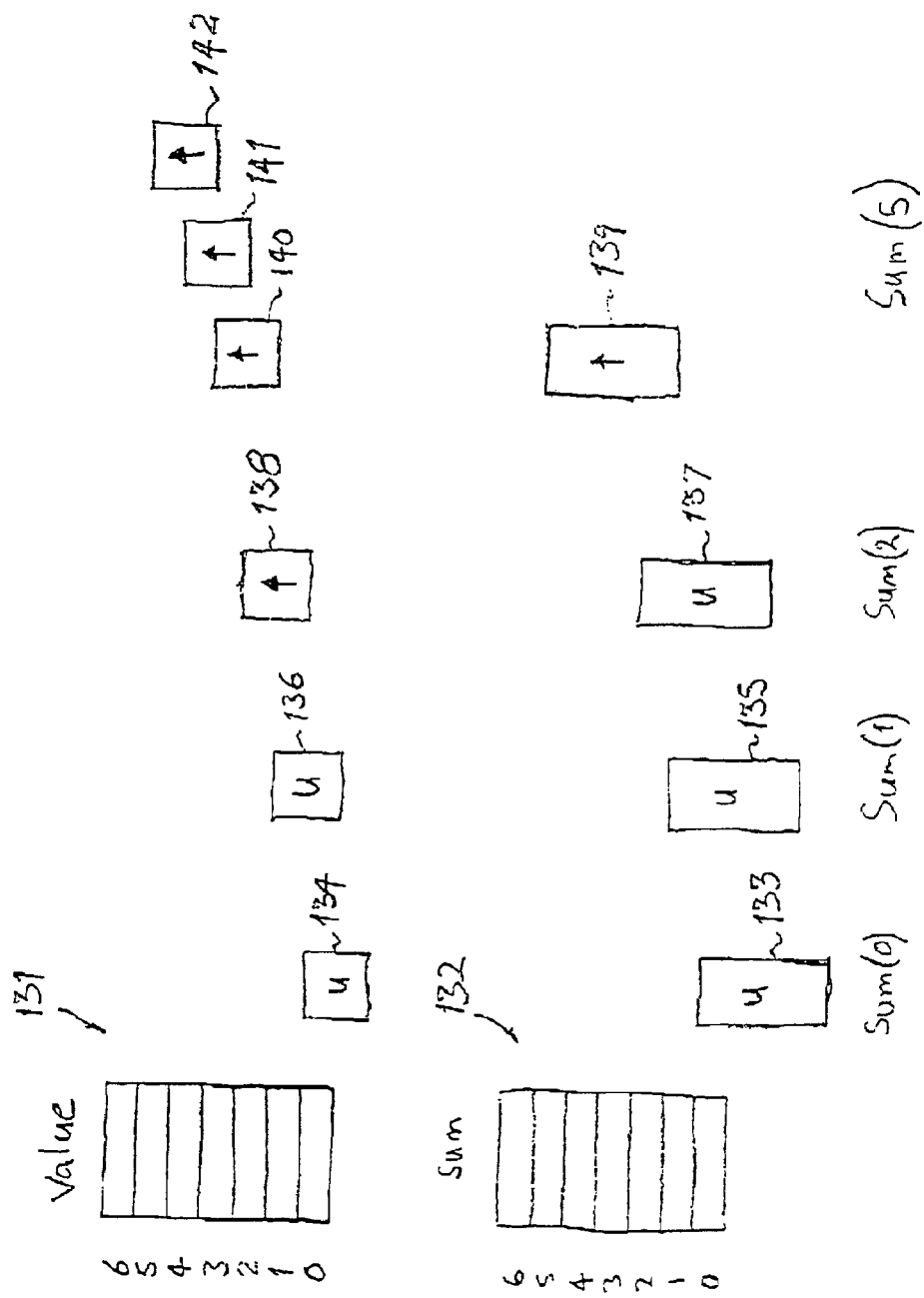
FIG. 6 illustrates the process of using the data window as determined on a set of data values.

The first step is to determine the relevant sliding window size for each data set. Taking each case separately:

1. sum(0):

Sum gets initialised with a window 103 starting at t=0, ending at t=0, i.e. it has a size of 1cell. Because no sliding took place, the sliding direction is undecided. The window 103 can be represented by the notation: sum[0,0, undecided].

sum(0) calls val(0)

val gets initialised with a window 104 starting at t=0, ending at t=0, i.e. it has a size of 1 cell. Because no sliding took place, the sliding direction is undecided. The window 104 can be represented by the notation: val[0,0, undecided].

val(0) returns
sum(0) returns
2. sum(1):
The sum window 105 slides up to [1, 1, up]
sum(1) calls sum(0)
because sum is sliding up, sum(1) is busy being calculated and sum(0) is required, the window size has to be expanded 106. sum's sliding status becomes [0,1, up], i.e., size=2. Further, because sum now encompasses all values calculated thus far, sum's sliding status becomes [0,1, undecided], i.e., size=2
sum(0) returns
sum(1) calls val(1)
val slides up 107 to [1,1, up]
val(1) returns
sum(1) returns
3. sum(2):
sum slides up 108 to [1,2, up]
sum(2) calls sum(1)
sum(1) is in the window 108
sum(1) returns
sum(2) calls val(2)
val slides up 109 to [2,2, up]
val(2) returns
sum(2) returns
4. sum(5):
sum window slides up 111 to [4,5, up]
a) sum(5) calls sum(4)
sum(4) is in the window 111.
b) sum(4) calls sum(3)
because sum is sliding up, sum(4) and sum(5) are busy being calculated and sum(3) is required, the window size 111 has to be expanded 112, sum's sliding status 112 becomes [3,5, up], i.e., size=3.
c) sum(3) calls sum(2)
because sum is sliding up, sum(3) through sum(5) are busy being calculated and sum(2) is required, the window size has to be expanded 113, sum's sliding Status becomes [2,5, up], i.e., size=4.
sum(2) returns
execution is still at (c)
sum(3) calls val(3)
val slides up 114 to [3,3, up]
val(3) returns
sum(3) returns
execution returns to (b)
sum(4) calls val(4)
val slides up 115 to [4,4, up]
val(4) calls val(3)
because val is sliding up, val(4) is busy being calculated and val(3) is required, the window size has to be expanded, val's sliding status 116 becomes [3,4, up], i.e., size=2
val(3) returns
val(4) returns
execution returns to (a)
sum(5) calls val(5)
val slides up 117 to [4,5, up]
val(5) returns
sum(5) returns As a result of the above initial analysis, on each data set, the sliding window sizes are determined as follows:
val needs a window size of 2
sum needs a window size of 4
Turning now to FIG. 6, when it is subsequently necessary to use sliding windows to determine new value 131 and sum 132 on data sets the following actions are taken:
Cases:
1. sum(0)
sum gets initialised with a window 133 of size 4, arbitrarily positioned to include t=0. Lets assume the position sum[−3, 0, undecided].
sum(0) calls val(0)
val gets initialised with a window 134 of size 2, arbitrarily positioned to include t=0. Lets assume sum[−1,0, undecided].
val(0) returns
sum(0) returns
2. sum(1)
sum slides 135 to [−2,1, undecided]. No values have dropped out of the sliding window 135, so the direction remains undecided.
sum(1) calls sum(0)
sum(0) is in the window
sum(0) returns
sum(1) calls val(1)
val slides 136 up to [0,1, undecided]. Note: No values have dropped out of the sliding window 136, so the direction remains undecided.
val(1) returns
sum(1) returns
3. sum(2)
sum slides 137 up to [−1,2, undecided]. No values have dropped out of the sliding window, so the direction remains undecided.
sum(2) calls sum(1)
sum(1) is in the window
sum(1) returns
sum(2) calls val(2)
val slides up 138 to [1,2, up]. The value at t=0 have dropped out of the sliding window, so the direction of window 138 becomes 'up'.
val(2) returns
sum(2) returns
4. sum(5)
sum slides 139 up to [2,5, up]. The values at t=0 and t=1 have dropped out of the sliding window, so the direction of window 139 becomes 'up'.
a) sum(5) calls sum(4)
sum(4) is in the window
b) sum(4) calls sum(3)
sum(3) is in the window
c) sum(3) calls sum(2)
sum(2) is in the window
sum(2) returns
execution is still at (c)
sum(3) calls val(3)
val slides up 140 to [2,3, up]
val(3) returns
sum(3) returns
execution returns to (b)
sum(4) calls val(4)
val slides up 141 to [3,4, up]

val(4) calls val(3)
val(3) is in the window
val(3) returns
val(4) returns
execution returns to (a)
sum(5) calls val(5)
val slides up 142 to [4,5, up]
val(5) returns
sum(5) returns Each sum has been successfully calculated using a reduced window size. It can therefore be seen through the utilisation of the aforementioned algorithm that the window size is substantially limited and the number of data values to be loaded into memory is reduced. On large data sets, there is therefore provided the opportunity to substantially reduce the movement of data into memory devices.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

What is claimed is:

1. A method of reducing the amount of computer memory utilized in calculating a formula on a collection of a plurality of series of data values, the method comprising the steps of:
   (a) for each data value member of at least one series of said collection, determining the size of a window of data values required to calculate said formula;
   (b) obtaining the size of the window required for the at least one series on the basis of said determination, and
   (c) utilizing said window having said obtained size to determine data values to be stored in computer memory when calculating the formula when applied to other series of data values in said collection.

2. The method as claimed in claim 1, wherein said step (c) for members within a series of data values in said collection, includes:
   (a) utilizing said window to determine a first initial set of data values in the series to be stored in a portion of computer memory; and
   (b) for subsequent sets of data values, loading the data values into the same portion of computer memory over locations of previously loaded data values.

3. A computer system, with a primary memory store, comprising:
   a computer program having a process for carrying out a formula calculation on a collection of series of data values, the calculation being carried out using members of the series with the calculation for a current member of the series being dependent on other data values located relative to the current member of the series, the process including:
   (a) for each member of said series, determining a window size corresponding to a relative series of consecutive data values required for determining said formula for said member;
   (b) obtaining the size of the window required for the series on the basis of said determinations; and
   (c) utilizing said window having said obtained size to determine data values to be stored in computer memory when calculating the formula when applied to other series of data values in said collection.

4. The computer system as claimed in claim 3, wherein said step (c) includes:
   for a first one of said current members, loading into said first primary memory store and initial corresponding relative series of consecutive data values; and
   for subsequent current members, loading only new members of said corresponding relative series into said primary memory store.

5. The computer system as claimed in claim 4, wherein said series of consecutive data values are arranged in a column.

6. The computer system as claimed in claim 3, wherein new values are loaded into said primary store at an address determined by a modified modulo arithmetic operator which produces positive address values only.

7. The method as claimed in claim 1, wherein the size of the window obtained in step (b) is the minimum size required to calculate the formula for every data value in the at least one series.

8. The method as claimed in claim 1, wherein said step (c) further includes moving the series of data values through a fixed portion of computer memory, and utilizing the data values while in the computer memory to calculate said formula.

9. The computer system of claim 3, wherein said step (a) further includes:
   calculating said formula on an initial data set to determine a minimum window size by providing an initial current window around a current data value to be calculated;
   determining in accordance with the formula, other data values required,
   wherein
      if the other data values are below the current window, sliding the window down or making the sliding window bigger to encompass the other data values, and
      if the present sliding direction is to slide the window up, making the window bigger to encompass the other data values, and if the window becomes large enough to encompass the other data values, setting the sliding direction to be undefined, and
      if the present direction is sliding up then sliding the window down by dropping previously calculated values from the top of the current window, provided that no value that is busy being calculated may be dropped off;
   upon completion of the calculation of the formula, determining a final required window size;
   subsequently, for each of the other data sets in the series, utilizing the final required window size to calculate the formula for each data set by moving through the data set and storing values in the current window within the primary memory store.

* * * * *

UNITED STATES PATENT AND TRADEMARK OFFICE
CERTIFICATE OF CORRECTION

PATENT NO. : 6,877,021 B2
DATED : April 5, 2005
INVENTOR(S) : Schneider et al.

It is certified that error appears in the above-identified patent and that said Letters Patent is hereby corrected as shown below:

Title page,
Item [*] Notice, delete "This patent is subject to a terminal disclaimer.".

Signed and Sealed this

Seventh Day of March, 2006

JON W. DUDAS
*Director of the United States Patent and Trademark Office*